United States Patent

[11] 3,584,931

| [72] | Inventor | Uwe Doring<br>Hamburg, Germany |
|---|---|---|
| [21] | Appl. No. | 773,197 |
| [22] | Filed | Nov. 4, 1968 |
| [45] | Patented | June 15, 1971 |
| [73] | Assignee | Licentia Patent-Verwaltungs-G.m.b.H.<br>Frankfurt am Main, Germany |
| [32] | Priority | Nov. 2, 1967 |
| [33] | | Germany |
| [31] | | P 15 72 727.2 |

[54] BINOCULAR VIEWING INSTRUMENT
13 Claims, 8 Drawing Figs.

[52] U.S. Cl. .................................................. 350/36,
350/145, 356/25, 351/1, 351/3, 351/26
[51] Int. Cl. ................................................... G02b 21/20
[50] Field of Search .......................................... 350/36,
137, 138, 143, 144, 145, 146; 356/23, 25; 351/1,
3, 26, 28

[56] References Cited
UNITED STATES PATENTS

| 2,224,775 | 12/1940 | Bartow | 350/130 X |
| 2,544,624 | 3/1951 | Whittaker | 350/130 X |
| 2,553,171 | 5/1951 | Campos | 350/145 X |
| 2,625,853 | 1/1953 | Hayward | 350/36 |
| 2,716,920 | 9/1955 | Rosier | 350/36 |
| 3,186,473 | 6/1965 | Myers et al. | 350/266 X |
| 3,261,977 | 7/1966 | Velden | 350/130 X |
| 3,423,522 | 1/1969 | Zwick | 350/6 UX |
| 2,337,139 | 12/1943 | Veatch | 350/144 |
| 3,464,759 | 9/1969 | Scholer et al. | 350/36 |

Primary Examiner—David Schonberg
Assistant Examiner—Michael J. Tokar
Attorney—Spencer & Kaye ABSTRACT: Binocular viewing instrument having two viewing channels including two light entry apertures and two light exit apertures. Arranged near the entry and exit apertures, respectively, are reflecting surfaces which direct beams of light from each respective entry aperture to a corresponding exit aperture. Between the reflecting surfaces are provided an objective lens, a common image converter and/or an image amplifier for both viewing channels having a greater persistence than the human eye, and an ocular lens. The beams of light for both viewing channels are passed through each of these elements. Also, near the light entry and exit apertures are located shutter devices for each viewing channel. The entry and exit shutter devices are coupled to coact with one another and are constructed to alternatingly open one viewing channel and close the other at a frequency greater than the critical flicker frequency of the human eye upon commands received from a control means. By this arrangement, human eyes are provided with a total and stereoscopic image.

PATENTED JUN15 1971 3,584,931

Inventor:
Uwe Döring
By: Spencer & Kaye
Attorneys

BINOCULAR VIEWING INSTRUMENT

BACKGROUND OF THE INVENTION

The present invention relates to a binocular viewing instrument having two viewing channels.

Such viewing instruments are provided, in a known manner, with an image converter and/or an image amplifier for each viewing channel. In front of the entry of the image converter there is an objective and behind its exit there is an ocular. It is possible with such viewing instruments to see an image stereoscopically since the left eye of the observer perceives only the image falling into the objective of the left viewing channel and the right eye only the image falling into the objective of the right viewing channel.

The application of such viewing instruments extends from their use as hand-held instruments, their attachment to searchlight carriers, for example, to the permanent installation in vehicles.

The known viewing instruments, however, have the disadvantage of being constructed rather large and considerably heavy, due to an image converter being provided for each viewing channel which requires an appropriate voltage source. Moreover, the cost of the image converters alone contributes substantially to the overall production cost of the viewing instrument. In order to eliminate these disadvantages and, in particular, to reduce the cost of production, viewing instruments were constructed which are provided with but one viewing channel. The single viewing channel includes one image converter with an objective arranged in front thereof. Two oculars are disposed behind the image converter and serve to view the image on the screen. The image visible on the screen is transmitted to these two oculars, for example, by mirrors. These viewing instruments, however, have the disadvantage that they do not provide a stereoscopic image of the scene being viewed, thus making it impossible to estimate the distances involved.

SUMMARY OF THE INVENTION

It is an object of the present invention to provide a viewing instrument having two viewing channels which, when compared with known viewing instruments, is lightweight, of small dimensions and which provides stereoscopic viewing.

It is also an object of the present invention to provide a viewing instrument which can be produced at less cost than heretofore possible.

These objects are achieved, according to the present invention, by locating a known common image converter and/or image amplifier between the light entry apertures and the light exit apertures of both viewing channels. To reflect each beam path through the image converter, known mirrors, prisms or similar optical elements are provided in each viewing channel. At least one objective is provided between the image converter and the light entry apertures and at least one ocular is provided between the image converter and the light exit apertures. Moreover, optical shutter devices having an associated control means are located behind the light entry apertures and in front of the light exit apertures of each viewing channel. The control means actuates the shutter devices alternatingly to open one viewing channel and close the other viewing channel at a frequency which is greater than the critical flicker frequency of the human eye.

The viewing instrument according to the present invention provides, on the one hand, stereoscopic viewing of the scene to be observed, since the left eye perceives the image falling into the viewing channels only while the left viewing channel is open and the right eye perceives the image only while the right viewing channel is open. As is known, the inertia of the human eye results in the images reaching each eye to overlap for a fraction of a second, for example, for an interval of one twenty-fifth of a second, and thus form a composite total image. On the other hand, the viewing instrument, according to the present invention, can be produced at a substantially reduced cost. When compared to the cost of viewing instruments in which the image converter has been eliminated in order to facilitate the possible reduction in size of the voltage source for the image converter, the additional costs of providing shutter devices and associated control means, according to the present invention, are relatively insignificant. The operation of the shutter devices occurs in such a manner that the ratio of the time interval for the closing of the channel to the time interval for switching the shutter device is as large as possible.

Instead of the conventional arrangement in binocular-type viewing instruments of providing the objective and ocular in the light entry apertures and light exit apertures, respectively, the present invention affords the further possibility of locating a single objective in front of the image converter and a single ocular behind the image converter. The shutter devices for the viewing channels are advisably disposed directly behind the light entry aperture or, respectively, directly in front of the light exit aperture. Moreover, under certain favorable circumstances, it would be possible to arrange the shutter devices behind the first surface mirror in the beam path behind the light entry aperture or, respectively, directly in front of the light exit aperture. Moreover, under certain favorable circumstances, it would be possible to arrange the shutter devices behind the first surface mirror in the beam path behind the light entry apertures or, respectively, in front of the last surface mirror, which is positioned in front of the light exit aperture.

The present invention proposes, in one embodiment of the viewing instrument, that shutter devices for both viewing channels, be disposed behind the light entry apertures and in front of the light exit apertures, respectively; each comprise a rotating disc which covers both viewing channels and which is provided with an opening. Both discs of this embodiment of the viewing instrument are rigidly connected to each other by means of a shaft so that they cooperate synchronously, once they have been properly adjusted. The number and size of the openings per disc is selected, in accordance with the particular angular velocity at which the disc rotates. Thus, the viewing channels are opened alternatingly, one viewing channel of the viewing instrument being opened, while the other viewing channel is closed at a frequency which is greater than the critical flicker frequency of the human eye.

The viewing instrument of the present invention provides, in a further embodiment, that the shutter devices of both viewing channels located behind the light entry apertures and in front of the light exit apertures, respectively, are each formed of a rocking member which is operated by a control means to pivot around its center axis. The rocking member is here provided, for example, with two opaque covers having dimension which conform to the cross section of the viewing channels and which are rigidly connected to each other. A drive means connected to a control means engages the rocking member approximately at its center. The drive means pivots the rocking member, which is perpendicular to the beam path, alternatingly in one rotational direction, then the other, around its center axis thereby alternatingly opening first one viewing channel then the other.

The viewing instrument of the present invention provides in another embodiment, that the shutter devices for both viewing channels located behind the light entry apertures and in front of the light exit apertures, respectively, are each formed by one opaque cover which can be moved between the two viewing channels. The cover for this purpose is advisably provided for each movement in a guide member arranged between the two viewing channels and perpendicular to the beam path.

It is further proposed in another embodiment of the present invention, that the shutter devices of both viewing channels behind the light entry apertures and in front of the light exit openings, respectively, be formed of an opaque strip provided with perforations and covering both viewing channels. This strip is in the form of an endless strip and is guided over guide rollers.

To operate the shutter device the control means is connected to an electrical or electromagnetic drive means having an armature, which is preferably formed by the shutter device. This feature relates to all of the species of the shutter device, except as formed of Kerr cells or of an opaque endless strip of material.

In another embodiment of the present invention, the shutter devices are formed of a Kerr cell having polarization filters disposed in front and behind thereof and that an electric control device alternatingly opens the Kerr cell of one viewing channel and closes the Kerr cell of the other viewing channel. The Kerr cells of each viewing channel are here synchronously controlled. If a voltage is applied to one Kerr cell, the arrangement becomes light permeable since in this case, as is known, the Kerr cell rotates the plane of the polarized light.

In another embodiment of the present invention, the shutter devices are formed of opaque covers, which are each pivotally disposed in a plane perpendicular to the beam path, and, which are driven by means of a control device preferably containing electromagnetic coils. The rotatably disposed covers are excited alternatingly by the electromagnetic coils in such a manner that the covers of one viewing channel are opened and those of the other viewing channel are closed.

In another embodiment of the present invention, mirrors, or the like provided for reflecting the beam path, serve as the shutter devices. These mirrors or the like are rotatably disposed in a plane perpendicular to the beam path and their angular position with respect to the light entry apertures or light exit apertures, respectively, can be adjusted by means of a control device preferably containing electromagnetic coils. Such a configuration of the shutter devices has the additional advantage that special opaque covers are eliminated.

Other embodiments of the viewing instruments according to the present invention are possible in addition to the above-described shutter devices; for example, mechanical shutters in the form of louvers or any means or media the optical transmission characteristics of which change under the influence of an electrical or magnetic field.

DESCRIPTION OF THE PREFERRED EMBODIMENTS

Figure 1:
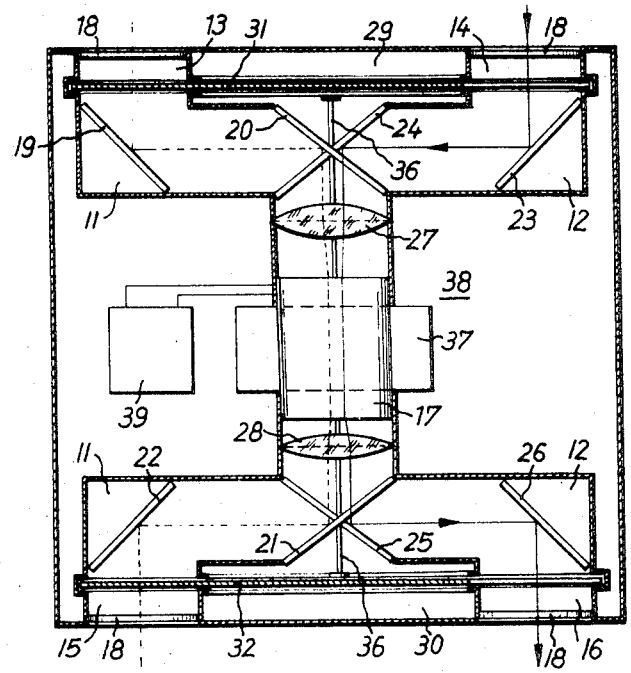
FIG. 1 is a schematic view of the viewing instrument according to the present invention.
Figure 1A:
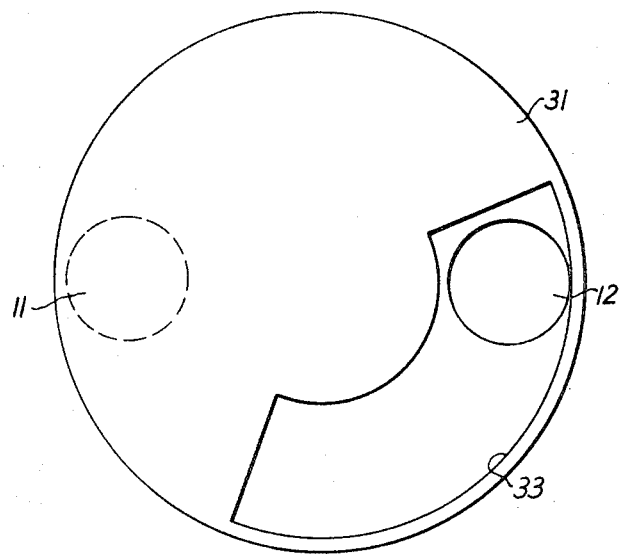
FIG. 1a is a detailed view of the shutter device of the viewing instrument shown in FIG. 1.

FIG. 1 shows a viewing instrument 10 having two viewing channels 11 and 12. Between the light entry apertures 13 and 14 and the light exit apertures 15 and 16 of the viewing channels 11 and 12 a common image converter 17 is disposed. The light entry apertures 13 and 14 and the light exit apertures 15 and 16 are each provided with a transparent covering disc 18. To deflect the path of the light beam of each viewing channel 11 and 12 over the image converter 17, surface mirrors 19, 20, 21 and 22 or 23, 24, 25 and 26, respectively, are provided. Of these surface mirrors, the mirrors 20, 24 and 21, 25 are constructed here in such a manner that at least the half of each of these mirrors directed toward the image converter 17 is transparent when it is exposed to light from its dark side. Between the light entry apertures 13, 14 and the image converter 17 there is an objective lens 27 and between the light exit openings 15, 16 and the image converter 17 there is an ocular lens 28. Behind the light entry apertures 13, 14 there is provided an optical shutter device 29 and in front of the light exit apertures 15, 16 there is provided an optical shutter device 30. Both shutter devices 29 and 30, the entry and exit shutter devices, respectively, are common to both viewing channels 11 and 12. The shutter devices 29, 30 are here in the form of discs 31, 32, respectively. Each of the discs 31 and 32, covers both viewing channels 11 and 12 and each of the discs 31 and 32 has one opening 33. This is best seen in FIG. 1a where disc 31 is illustrated. Both discs 31 and 32 are rigidly connected to each other by a shaft 36. Auxiliary means for adjusting both discs 31 and 32 with respect to each other are provided which are, however, not shown. A drive 37 of a control device engages shaft 36 and causes it to rotate. To provide the image converter 17 with potential, a voltage source 39 is provided and connected thereto. The discs 31 and 32 are adjusted with respect to each other in such a manner that their openings are aligned with each other.

To operate the viewing instrument 10 it is presumed that the control device 38 imparts an angular velocity to the shaft 36, via drive 37, and thus to discs 31 and 32. As shown in FIG. 1, this results in each viewing channel being alternatingly opened and closed. For example, as shown in FIG. 1, while viewing channel 11 is blocked or closed, viewing channel 12 is opened. Viewing channel 12 is opened at a higher frequency than the critical flicker frequency of the human eye. It can be seen that in this position of discs 31 and 32 the viewing channel 11 is blocked by an opaque sector of disc 31 behind the light entry aperture 13 and by an opaque sector of disc 32 in front of the light exit aperture 15. The left eye of the observer does not perceive an image at this moment. The viewing channel 12, however, is open, since the opening 33 of the disc 31 behind the light entry aperture 14 is aligned with the opening 33 of the disc 32 in front of the light exit aperture 16. Thus, at this instant in the instrument's operation, the right eye can perceive only the light coming through the light entry aperture 14. As the discs 31 and 32 are rotated, viewing channel 11 is opened and viewing channel 12 is closed. When this occurs, the left eye will only perceive the light coming through light entry aperture 13. The rapid opening and closing of viewing channels 11 and 12 in an alternating manner and the inertia of perception of the human eye result in an overlapping of the images offered to each eye for a fraction of a second. The images are, therefore, perceived as a fixed total image. The image converter 17 employed is alternately charged with the images from viewing channel 11 and those from viewing channel 12. A prerequisite here for the operation of the viewing instrument 10 is that the persistence of the image converter 17 continues even when the human eye can no longer detect the rapid change of images. This prerequisite is met by available image converters.

Instead of the shown embodiment of each of the discs 31, 32, it would be possible to employ a slotted, perforated, or toothed disc.

Figure 2:
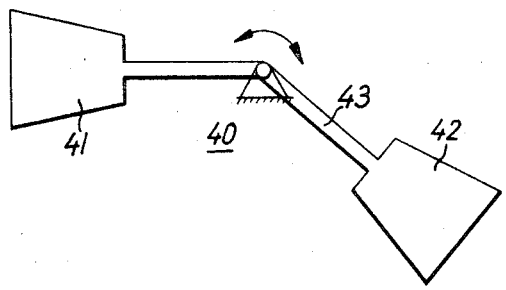
FIG. 2 is a detailed view of another embodiment of the shutter device according to the present invention.

FIG. 2 shows another embodiment of the shutter devices 29, 30 of FIG. 1. The FIG. 2 shutter device is in the form of a rocking member 40. The rocking member 40 has two opaque covers 41, 42. The area of each cover 41, 42 conforms to the cross-sectional area of the viewing channels 11, 12. The covers 41 and 42 are connected to each other by means of a supporting metal sheet 43. The rocking member 40 is intended to be moved by a drive means (not shown) connected to a control device such as 38 of FIG. 1. The rocking member 40 would pivot around its center axis in the plane of the drawing so that one viewing channel is covered and the other is opened in an alternating manner.

Figure 3:
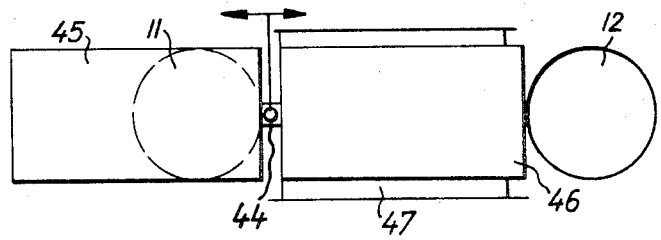
FIG. 3 is a view of still another embodiment of the shutter device according to the present invention.

FIG. 3 shows yet another embodiment of the shutter devices 29, 30 of FIG. 1. In this case, each shutter device is in the form of pusher 44 which bears two opaque cover members 45 and 46. The pusher 44 is moved, for example, by an oscillating armature (not shown) connected to a control device such as 38 of FIG. 1. The pusher 44 is alternatingly driven to the left and to the right in the plane of the drawing. This results in opening viewing channels 11 and 12 in alternating sequence. The viewing channels 11 and 12 of FIG. 1 are here indicated schematically. The areas of cover members 45 and 46 conform, respectively, to the cross-sectional areas of viewing channels 11 and 12. In the position shown of pusher 44, the viewing channel 11 is covered and viewing channel 12 is opened. A guide member 47 prevents a lateral deviation of the moved pusher 44.

Figure 4:
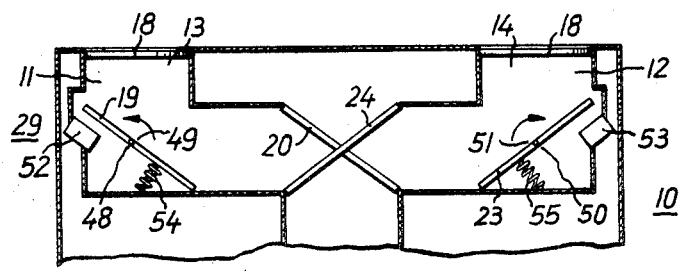
FIG. 4 is a view of yet another embodiment of the shutter device according to the present invention in the viewing instrument.

FIG. 4 is a schematic view of a portion of the viewing instrument 10 of FIG. 1. Here, the shutter device 29 is formed by a special arrangement of the surface mirrors 19 and 23, respectively. The mirrors 19 and 23 are pivotally held by means of pins 48, 49 and 50, 51, respectively. The mirrors 19 and 23 are movable in a plane perpendicular to the beam path. An electromagnetic coil 52 or 53, respectively, is provided on the dark side of the mirrors 19 or 23, respectively. The electromagnetic coil 52 or 53, respectively, alternatingly actuates the respectively associated mirror 19 or 23 to change its angular position with respect to the light entering from the corresponding aperture 13 or 14, respectively. Under the action of a spring 54 or 55, respectively, the mirror 19 or 23, respectively, is again moved into its illustrated initial position after it has been deflected. The movement of mirrors 19 or 23, respectively, causes the light falling into the associated viewing channel not to impinge on the corresponding mirror 20 or 24, respectively. Thus, the image converter 17 is alternatingly fed with light coming through the light entry aperture 13 or 14, respectively. As is the case with all shutter devices, movement of mirror 19 or 23, respectively, is coupled with movement of mirror 22 or 26, (see FIG. 1) respectively. The coupling is produced in this case by synchronously feeding the electromagnetic coils of the viewing channel 11 and the viewing channel 12, respectively. The moving coils 52 or 53, respectively, and spring 54 or 55, respectively, are parts of control device 38 (see FIG. 1).

The shutter device 29 located behind the light entry apertures 13 and 14 of FIG. 4 corresponds in all respects to the shutter device 31 located in front of light exit openings 15 and 16. It would however, also be conceivable to select a suitable combination of shutter devices for the viewing instrument.

Figure 5:
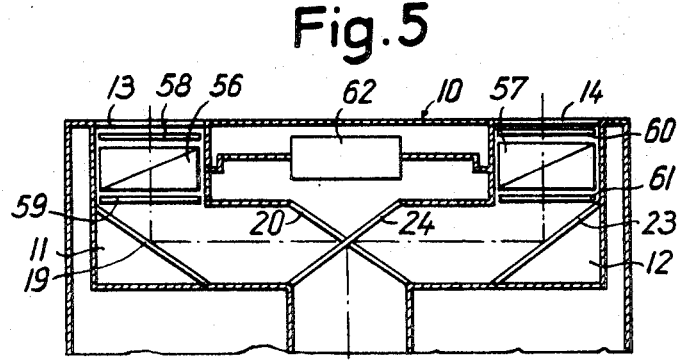
FIG. 5 is a view of yet another embodiment of the shutter device according to the present invention.

FIG. 5 shows another embodiment of the shutter devices 29, 30 in FIG. 1. Here, the shutter device is formed by a pair of Kerr cells 56, 57 one for each viewing channel 11, 12, one of them located behind the light entry apertures 13, 14 and the other located ahead the light exit apertures 15, 16. The shutter device includes polarization filters 58, 59 and 60, 61 disposed ahead and behind each Kerr cell 56, 57. The shutter device includes furthermore electrical control means 62 which alternatingly opens the Kerr cells 56 of one viewing channel 11 and closes those 57 of the other viewing channel 12.

Figure 6:
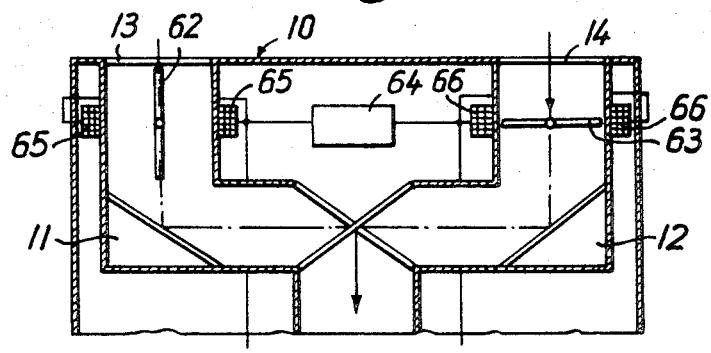
FIG. 6 is a detailed view of still another embodiment of the shutter device according to the present invention.

FIG. 6 shows still another embodiment of the shutter devices 29, 30 in FIG. 1. Here, the shutter device is formed of a pair of opaque cover members 62, 63 pivotally mounted in a plane perpendicular to the direction of the light beam. Control means 64 includes drive means 65, 66 having electromagnetic coils.

Figure 7:
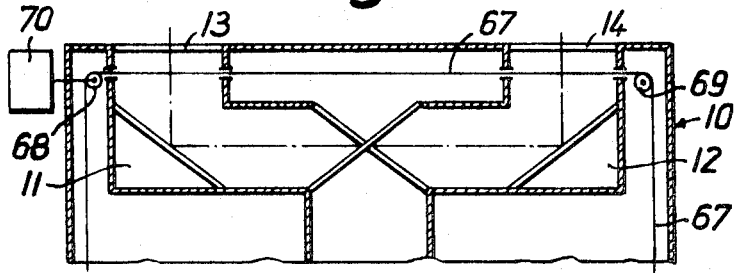
FIG. 7 is a view of yet another embodiment of the shutter device according to the present invention in the viewing instrument.

FIG. 7 shows still another embodiment of the shutter devices 29, 30 in FIG. 1. Shown shutter device includes an opaque endless strip of material 67 and guide rolls 68, 69 one of them being driven by drive means 70. Said endless strip 67 being provided with openings (not shown) and being mounted for circulation on said guide rolls 68, 69. The endless strip 67 blocks both of the viewing channel 11, 12 except when provided openings of the strip enter one viewing channel 11 or 12 during circulation.

It will be understood that the above description of the present invention is susceptible to various modifications, changes and adaptions.

I claim:

1. A viewing instrument having two viewing channels, comprising, in combination:

a. a body member having two light entry apertures at one end thereof and two light exit apertures at the other end thereof, said light entry and light exit apertures being aligned in pairs, one pair for each of said viewing channels;

b. an image converter common to both said viewing channels positioned between said light entry and light exit apertures;

c. an objective lens located between said image converter and said light entry apertures;

d. an ocular lens located between said image converter and said light exit apertures;

e. entry reflecting surfaces for each of said viewing channels located near and behind said light entry apertures and exit reflecting surfaces for each of said viewing channels located near and in front of said light exit apertures, some of said entry and exit reflecting surfaces being arranged with respect to one of said light entry apertures to deflect a beam of light therefrom via said objective lens, image converter and ocular lens to the light exit aperture aligned with said one light entry aperture, and some of said entry and exit reflecting surfaces being arranged with respect to the other light entry aperture to deflect a beam of light therefrom via said objective lens, image converter and ocular lens to the light exit aperture aligned with said other light entry aperture;

f. an entry shutter device located near and behind said light entry apertures and an exit shutter device located near and in front of said light exit apertures; each of said shutter devices being for both of said viewing channels; said shutter devices being coactingly coupled to one another and arranged to open only one viewing channel at a time; and g. control means connected to said shutter devices for alternatingly opening one viewing channel and closing the other viewing channel by actuating said shutter devices at such a speed as to provide the human eye with a total and stereoscopic image.

2. Viewing instrument as defined in claim 1 wherein said reflecting surfaces are mirrors.

3. Viewing instrument as defined in claim 1 wherein said reflecting surfaces are prisms.

4. Viewing instrument as defined in claim 1 wherein each of said shutter devices is in the form of a rotatable disc having an opening, each of said discs covering both of said viewing channels except when said disc is rotated to bring said opening into one of said viewing channels.

5. Viewing instrument as defined in claim 1 wherein each of said shutter devices is in the form of a rocking member which is pivotal around its center axis; and said control means actuating said rocking member to cause it to pivot around said axis.

6. Viewing instrument as defined in claim 1 wherein each of said shutter devices is in the form of a movable opaque cover member mounted for movement between said two viewing channels.

7. Viewing instrument as defined in claim 1 wherein at least some of said entry reflecting surfaces and at least some of said exit reflecting surfaces, respectively, constitute said exit and entry shutter devices, the reflecting surfaces of each shutter device being rotatably disposed in a plane perpendicular to the direction of the light beam; and said control means being connected to said reflecting surfaces and having electromagnetic coils, said control means rotating said reflecting surfaces into angular positions with respect to the direction of the light beam.

8. Viewing instrument as defined in claim 1 wherein said control means includes electrical drive means for actuating each shutter device and having an armature formed by said shutter devices.

9. Viewing instrument as defined in claim 1 wherein each of said shutter devices includes Kerr cells, one for each viewing channel, and polarization filters are disposed ahead and behind each Kerr cell with respect to the direction in which light beams travel through said Kerr cells and wherein said control means is electrical and alternatingly opens the Kerr cells of one viewing channel and closes those of the other viewing channel.

10. Viewing instrument as defined in claim 1 wherein each of said shutter devices is formed of an opaque cover member pivotally mounted in a plane perpendicular to the direction of the light beam, and wherein said control means includes drive means having electromagnetic coils.

11. Viewing instrument as defined in claim 1 wherein each of said shutter devices includes an opaque endless strip of material and guide rolls, said endless strip being provided with openings and being mounted for circulation on said guide rolls, said endless strip blocking both of said viewing channels except when said opening enters one of said viewing channels during circulation of said endless strip.

12. A viewing instrument having two viewing channels, comprising, in combination:
  a. a body member having two light entry apertures at one end thereof and two light exit apertures at the other end thereof, said light entry and light exit apertures being aligned in pairs, one pair for each of said viewing channels;
  b. an image amplifier common to both said viewing channels positioned between said light entry and light exit apertures;
  c. an objective lens common to both said viewing channels and located between said image amplifier and said light entry apertures;
  d. an ocular lens common to both said viewing channels and located between said image amplifier and said light exit apertures;
  e. entry reflecting surfaces for each of said viewing channels located near and behind said light entry apertures and exit reflecting surfaces for each of said viewing channels located near and in front of said light exit apertures, some of said entry and exit reflecting surfaces being arranged with respect to one of said light entry apertures to deflect a beam of light therefrom via said objective lens, image amplifier and ocular lens to the light exit aperture aligned with said one light entry aperture, and some of said entry and exit reflecting surfaces being arranged with respect to the other light entry aperture to deflect a beam of light therefrom via said objective lens, image amplifier and ocular lens to the light exit aperture aligned with said other light entry aperture;
  f. an entry shutter device located near and behind said light entry apertures and an exit shutter device located near and in front of said light exit apertures; each of said shutter devices being for both of said viewing channels; said shutter devices being coactingly coupled to one another and arranged to open only one viewing channel at a time; and
  g. control means connected to said shutter devices for alternatingly opening one viewing channel and closing the other viewing channel by actuating said shutter devices at such a speed as to provide the human eye with a total and stereoscopic image.

13. A viewing instrument having two viewing channels, comprising, in combination:
  a. a body member having two light entry apertures at one end thereof and two light exit apertures at the other end thereof, said light entry and light exit apertures being aligned in pairs, one pair for each of said viewing channels;
  b. image converter means common to both said viewing channels and positioned between said light entry and light exit apertures;
  c. objective lens means located between said image converter and said light entry apertures;
  d. ocular lens means located between said image converter and said light exit apertures;
  e. entry reflecting surfaces for each of said viewing channels located near and behind said light entry apertures and exit reflecting surfaces for each of said viewing channels located near and in front of said light exit apertures, some of said entry and exit reflecting surfaces being arranged with respect to one of said light entry apertures to deflect a beam of light therefrom via said objective lens means, image modification means and ocular lens means to the light exit aperture aligned with said one light entry aperture, and some of said entry and exit reflecting surfaces being arranged with respect to the other light entry aperture to deflect a beam of light therefrom via said objective lens means, image modification means and ocular lens means to the light exit aperture aligned with said other light entry aperture;
  f. an entry shutter device located near and behind said light entry apertures and an exit shutter device located near and in front of said light exit apertures; each of said shutter devices being for both of said viewing channels; said shutter devices being coactingly coupled to one another and arranged to open only one viewing channel at a time; and
  g. control means connected to said shutter devices for alternatingly opening one viewing channel and closing the other viewing channel by actuating said shutter devices at such a speed as to provide the human eye with a total and stereoscopic image.